R. M. JETT.
SELF HEATING SOLDERING IRON.
APPLICATION FILED DEC. 16, 1911.
1,032,837.
Patented July 16, 1912.
2 SHEETS—SHEET 2.
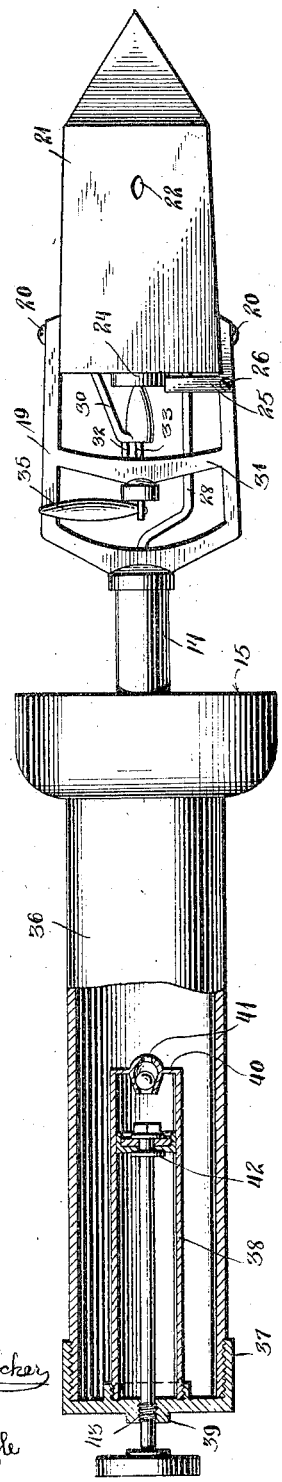
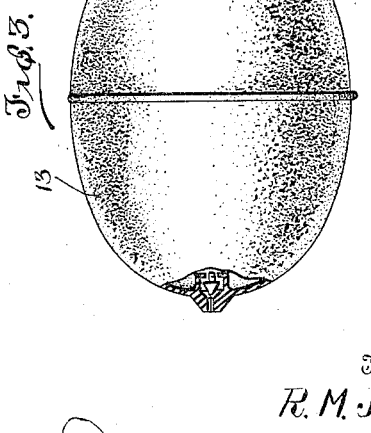
Witnesses
Ernest Osborne Crocker
Francis Boyle
Inventor
R. M. Jett
By
Attorneys

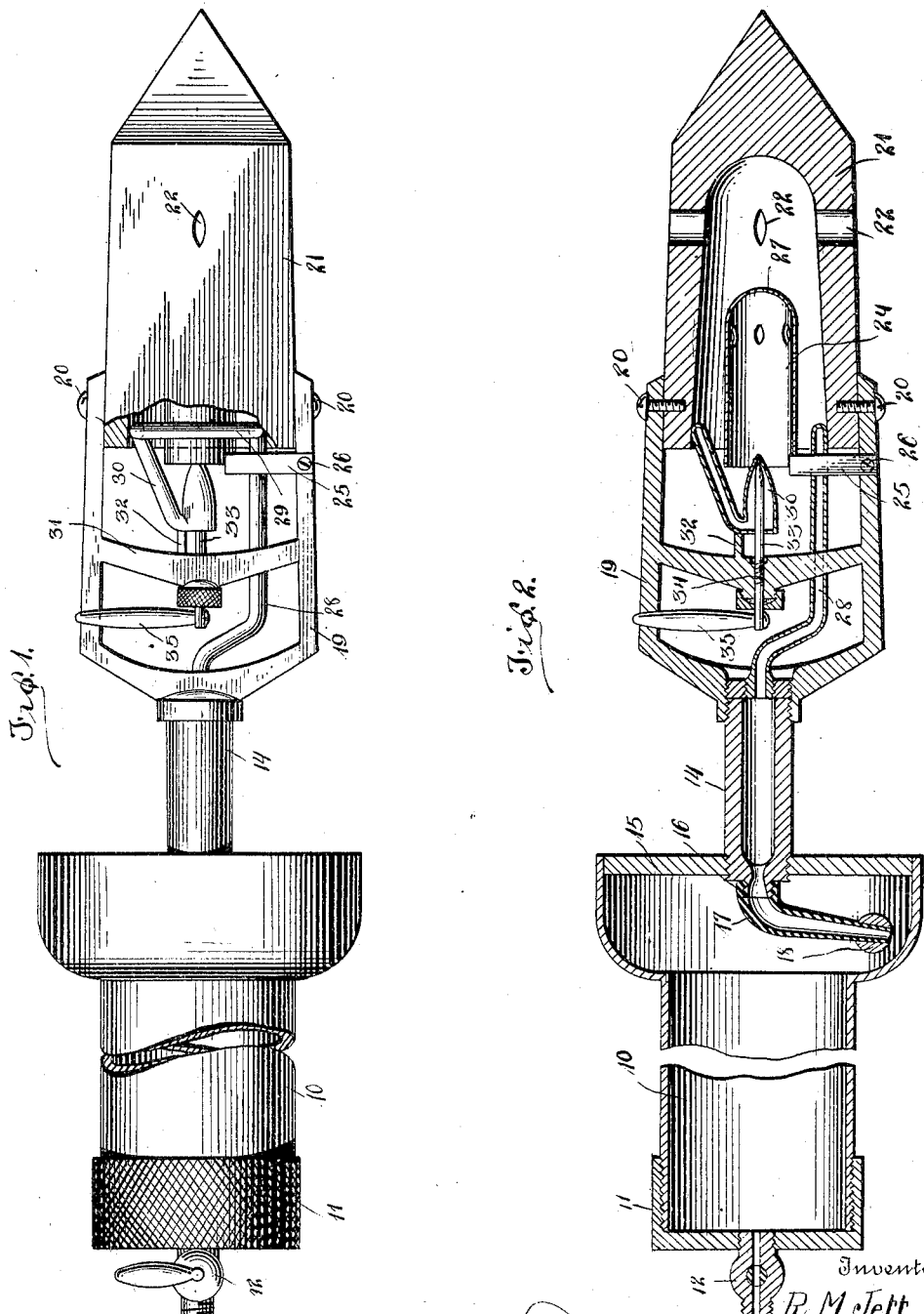

UNITED STATES PATENT OFFICE.

ROY MERLE JETT, OF GREENVILLE, ILLINOIS.

SELF-HEATING SOLDERING-IRON.

1,032,837.

Specification of Letters Patent. Patented July 16, 1912.

Application filed December 16, 1911. Serial No. 686,136.

*To all whom it may concern:*

Be it known that I, ROY M. JETT, a citizen of the United States, residing at Greenville, in the county of Bond, State of Illinois, have invented certain new and useful Improvements in Self-Heating Soldering-Irons; and I do hereby declare the following to be a full, clear, and exact description of the invention, such as will enable others skilled in the art to which it appertains to make and use the same.

This invention relates to self-heating soldering irons, and has for an object to provide a device of this character having a novel heater disposed within the detachable copper soldering point of the device.

The invention resides in a novel fuel supply pipe which embraces the burner nozzle so that the fuel is quickly converted into a dry gas which is blown out into the nozzle in a jet.

With the above object in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a side elevation of my improved soldering iron. Fig. 2 is a longitudinal sectional view through the soldering iron. Fig. 3 is a side elevation of the pump bulb. Fig. 4 is a side elevation of an extra soldering point. Fig. 5 is a longitudinal sectional view of a modified form of the soldering iron.

Referring now to the drawings in which like characters of reference designate similar parts, 10 designates the combined handle and gasolene reservoir, which is equipped at one end with a screw cap 11 having a pet cock 12 to which is attached a pump bulb 13 preferably of the type shown in Fig. 3. A pipe 14 is threaded at one end into the head 15 of the reservoir, and is provided with a nipple 16 upon which is secured a flexible tube 17 having a weighted end 18.

A yoke 19 is threaded on to the outer end of the pipe 14, and the branches of the yoke are equipped with screws 20 through the instrumentality of which a hollow copper soldering point 21 is secured, the soldering point being formed with the usual vent openings 22. The soldering point is thus detachably secured, and may be replaced when desired with a soldering point of different form, such for instance as the soldering point 23 shown in Fig. 4.

A burner nozzle 24 is arranged axially in the soldering point and is detachably secured to one of the yoke branches through the instrumentality of a bracket arm 25 which is secured to the yoke branch through the instrumentality of a screw 26 or the like. The outer end of the burner nozzle is provided with the usual vent openings 27.

A metal fuel supply pipe 28 is secured in any suitable manner to the outer end of the pipe 14, and is carried forwardly in close proximity to one of the yoke branches into the interior of the soldering point, being thence preferably directed about the burner nozzle in a half convolution as shown at 29, thence carried rearwardly along the opposite yoke branch and fixedly secured in any preferred manner to the base end of a substantially conical jet pipe 30 the discharge end of which projects into the interior of the nozzle. An arched bracket arm 31 bridges the branches of the yoke, and is provided with a finger 32 which is connected to and supports the jet pipe in axial relation to the nozzle. A needle valve 33 having a screw thread connection 34 with the bracket arm, is engaged axially through the jet pipe and serves to regulate the discharge of fuel therefrom, a handle 35 being secured to the needle valve for manipulating the same.

By virtue of the feed pipe being directed about the burner nozzle, the former will be intensely heated and the liquid fuel converted into a dry gas which blows out of the jet pipe into the nozzle upon opening the needle valve. Upon a flame being applied to the nozzle, the jet is ignited and shoots forward through the vent openings of the nozzle into the interior of the copper soldering point, intensely heating the latter.

In Fig. 5 I show a modified form of reservoir and pump, the remaining parts of the device being the same as above described in detail. In the modification 36 designates the combined handle and reservoir, the same being closed at one end by a threaded cap 37 which is axially provided with a pump casing 38. An internally threaded bearing 39 is formed on the cap at the outer end of the pump casing, and the inner end of the casing is closed by a head 40 having a ball valve controlled opening 41. A plunger 42 is arranged in the casing and the stem of the plunger is screw threaded as shown at 43 to engage in the threaded bearing 39 so as to lock the plunger stationary when not in use.

What is claimed, is:—

A soldering iron including a combined handle and fuel reservoir, a feed pipe carried thereby, a yoke carried by said feed pipe, a hollow soldering point secured to the yoke branches, a bracket bridging said branches, a burner nozzle disposed in said soldering point, a jet nozzle carried by said bracket and confronting the open end of said burner nozzle, a fuel supply pipe connected to said feed pipe and carried forwardly into said soldering point, being then directed about the burner nozzle in a half convolution, and then carried rearwardly and connected to said jet nozzle, and a needle valve carried by said bracket for regulating the discharge of fuel from said jet nozzle.

In testimony whereof, I affix my signature, in presence of two witnesses.

ROY MERLE JETT.

Witnesses:
J. A. BARR,
M. E. JETT.